(12) United States Patent
He

(10) Patent No.: US 8,283,847 B2
(45) Date of Patent: Oct. 9, 2012

(54) INTEGRATED-SHAPING TUBES FOR AN AUTOMATIC ONE-SHOT-MODELED COMPACT FLUORESCENT LAMP (CFL) IN MASS PRODUCTION AND THE METHOD THEREOF

(75) Inventor: Runlin He, Fujian (CN)

(73) Assignee: Xiamen Donglin Electronics Co., Ltd., Xiamen, Fujian (CN)

( * ) Notice: Subject to any disclaimer, the term of this patent is extended or adjusted under 35 U.S.C. 154(b) by 241 days.

(21) Appl. No.: 10/562,357

(22) PCT Filed: Jun. 25, 2004

(86) PCT No.: PCT/CN2004/000696
§ 371 (c)(1),
(2), (4) Date: Dec. 27, 2005

(87) PCT Pub. No.: WO2005/001885
PCT Pub. Date: Jan. 6, 2005

(65) Prior Publication Data
US 2006/0138931 A1      Jun. 29, 2006

(30) Foreign Application Priority Data

Jun. 27, 2003 (CN) .............................. 03 2 59029 U
Sep. 29, 2003 (CN) ................................ 03 1 35030

(51) Int. Cl.
*H01J 9/00* (2006.01)

(52) U.S. Cl. .............. 313/493; 445/17; 445/26; 445/22; 313/634

(58) Field of Classification Search .................... 65/319, 65/357, 492, 305, 308–313, 361; 445/22, 445/26, 27, 17; 313/483–485, 493, 495, 313/634, 312, 317, 318.01, 318.04, 318.05, 313/318.08, 318.11, 318.12, 113, 573, 339
See application file for complete search history.

(56) References Cited

U.S. PATENT DOCUMENTS

| 2,284,089 | A | * | 5/1942 | Hahn et al. ...................... 65/244 |
| 3,378,243 | A | * | 4/1968 | Morton .......................... 432/152 |
| 4,869,698 | A | * | 9/1989 | Itou .................................. 445/22 |
| 5,413,743 | A | * | 5/1995 | Prophet .......................... 264/1.7 |
| 6,307,316 | B1 | * | 10/2001 | Holzer .......................... 313/493 |

FOREIGN PATENT DOCUMENTS

| CN | 2540024 | * | 4/2002 |
| FR | EP0133831 | * | 6/1985 |
| JP | 6020448 | * | 1/1985 |

* cited by examiner

Primary Examiner — Joseph L Williams
Assistant Examiner — Fatima Farokhrooz

(57) ABSTRACT

An energy-saving fluorescent lamp with two or more integrated-shaping discharge tubes, automatically formed by a one-shot modelin to a U-tube with a desired curvature. Each of discharge tubes are disposed upon a conveyer for being shipped into a heater and is treated in portions of the discharge tube by one or more said wide flame nozzles of preset temperatures for a preset duration simultaneously into a U-tube with a pair of leg tubes for fitting into a pair of integrated-shaping dies when said mechanic arm opens up said pair of dies for molding into a U-tube with a preset curvature radius.

15 Claims, 9 Drawing Sheets

B-B

INTEGRATED-SHAPING TUBES FOR AN AUTOMATIC ONE-SHOT-MODELED COMPACT FLUORESCENT LAMP (CFL) IN MASS PRODUCTION AND THE METHOD THEREOF

BACKGROUND OF THE INVENTION

1. Field of the Invention

The present invention relates to compact fluorescent lamps (CFL) tubes, and more particularly, to the method for manufacturing an integrated-shaping tube for CFLs in one single processing.

2. Description of Prior Art

Most conventional compact fluorescent lamps (CFL) are configured in column-like structure (for instance, the U-shaped, n-shaped or H-shaped structure). Disadvantages associated with conventional column-like compact fluorescent lamps (CFL) are listed as follows. First of all, most light emitted from the inside of the discharge tube of a compact fluorescent lamps (CFL) is blocked by its neighboring tubes and tubes around it, so the luminous flux per watt of the compact fluorescent lamps (CFL) is significantly reduced; secondly, since most conventional column-like discharge tubes are physically configured in close approximate and hence have little space in between tubes, the heat generated by tubes can not be spread out soon, which also reduces luminosity factor and lifespan of tubes; thirdly, length of discharge tubes in most conventional CFLs are fixed and cannot be flexibly adjusted.

To solve the above-mentioned disadvantages, the patent case ZL01253432.3 provided "a ball-shaped compact fluorescent lamps (CFL)", as shown in FIG. 1 and FIG. 2, the lamp includes several discharge tube units 1' connected together by jumpers in bridge linkage, while the ball-shaped compact fluorescent lamps (CFL) is comprised of several petal-shaped discharge tubes 1' having a certain curvature radius, and each leg tube 11' of the discharge tube 1' is arranged on the sphere surface in uniform distribution. The middle portion of the leg tubes 11' are gradually opened, as shown in FIG. 3, in radial uniform distribution to increase the gaps of the leg tubes 11' of the adjacent compact fluorescent lamps (CFL) tubes 1' and the discharge tube unit 1'. In this case, the whole ball compact fluorescent lamps (CFL) tube comprises of several discharge tubes 1' having curvature radius (actually being stereo-radian as shown in FIG. 3) has three advantages, compared with the prior art, as listed below: one is that the increased gap between adjacent compact fluorescent lamps (CFL) discharge tube 1' makes the light, which emits from inside walls of the discharge tube 1', pass through the opposite gaps for an uniformly distributed light source; secondly, curved leg tubes 11' of the discharge tube 1' of the shape of a ball or an ellipse shortens the length of the discharge tube for an improved distribution curve flux; finally, increased gaps between adjacent discharge tubes 1' reduce the temperature around the lamp and improves the luminous flux per watt, further improving the reliability of ball compact fluorescent lamps (CFL).

In conventional technology of the art, the curved leg tube 11' of the discharge tube 1' having a certain stereo-radian and arranged in radial following a sphere, as shown in FIG. 3, is laid out on the sphere surface in uniform distribution for a better distribution curve flux and a uniform ball light source. Automatic mass production in manufacturing leg tubes 11' of the discharge tube 1' having said stereo-radian, and different curvature radius at different parts of leg tubes 11, however, is difficult to carry out, resulting in high production cost; defective rates in manufactured glass tubes also stays high. As a result, the above mentioned technique is only limited to compact fluorescent lamps (CFL) (with power above 28 W, and a tube diameter of 12.to 18 mm), as commonly seen in the market. In sum, the above mentioned conventional cannot be applied to compact fluorescent lamps (CFL) (with power less than 26 W, and a tube diameter less than 12 mm.

Therefore, the ball-shaped compact fluorescent lamps (CFL) provided by the patentZL01253432.3, although, has a high luminous flux per watt, a short-sized discharge tube, a better distribution curve flux of the ball light source, and a desired effect in cooling temperature, but it is difficult to put into scale production the invention disclosed in ZL01253432.3, especially for glass tubes of small diameter for CFL lamps of small power. Therefore, the structure of the patent ZL01253432.3 still needs to be improved.

OBJECTS AND SUMMARY OF THE INVENTION

It is therefore a main object of the present invention to provide a compact fluorescent lamps (CFL) discharge tube and a method and apparatus for manufacturing the same, which includes the following advantages:
1) high luminous flux per watt,
2) small-sized discharge tube,
3) improved distribution curve flux of the ball light,
4) a cooler ambient temperature around the lamp,
5) better suited to industrial scale production,
6) tube production made in an integrated-shaping mould with low production cost, high performance or low defective rate.

For achieving the above-mentioned object, the present invention provides an integrated-shaping mould for manufacturing a compact fluorescent lamps (CFL) discharge tube. A compact fluorescent lamp (CFL) is typically comprised of one or more discharge tubes, wherein each said discharge tube is an U-like glass tube with a pair of parallel leg tubes, and said pair of parallel leg tubes are bent to a curve with a specific curvature radius simultaneously, like the shape of a right brace ")".

The diameter of said pair of leg tubes of the discharge tube is the range of 6. to 12 mm.

Said discharge tube is bent to an arc, or an arc of an ellipse.

The number of the discharge tubes is in 2 to 5, or more.

The discharge tubes are then assembled into a compact fluorescent lamp(CFL), which can be configured to a circle, an ellipse, a rectangle, a triangle or a polygon.

The method of manufacturing the same is include the following processes:

In the first step, a straight glass tube is placed onto the conveyer for moving into a heater;

In the second step, with the desired portion of the straight glass tube melting in heat and bending to a U-like shape;

In the third step, dispose the bent U-like glass tube into a pair of integrated-shaping mould, including a cavity die and a male die;

In the fourth step, a mhanical arm controls over the closing-off and opening-up of the pair of integrated-shaping mouldsto further shape the U-like glass tube to a pre-set curvature radius;

In the fifth step, a specific portion of the U-like glass tube is blown at a preset specific range of temperatures for a desired shape;

Finally, the mechanical arm opens up the pair of integrated-shaping moulds and a finished glass tube is done.

In said first step, based on different shapes of the sinuosity of the glass tube, different segments or portions of the U-like glass tube is treated with different temperatures in heating; for example, flames at different temperatures heats up different segments or portions of the glass tube; or alternatively, flame of the same temperature can be used to burn different segments or portions of the U-like glass tube with time period of different length. In sum, there are a total of three heating parameters controlling the shape of the final product, i.e. temperatures of heating flame, specific portions of the glass tube being heated, and length of time in heating specific portions of the glass.

In said first step, the glass tube is conveyed to lie above three wide-section flaming nozzles of different width.

In said first step, the wide-nozzles are arranged in the sequence of a first single firing head followed by a second firing head followed in turn by a triple firing head, or alternatively, in the sequence of a first single firing head followed by a triple firing head followed in turn by a single firing head.

The integrated-shaping moulds or dies used for automatically manufacturing said U-glass tube is typically comprised of a male die and a cavity die, the die delimiting boundary is formed with curved axils of the discharge tube so that the U-groove is divided two half-portions respectively formed on the cavity die and the male die, the cross-section of the U-groove on each die appears to be in half a circle.

The radius of the U-groove is in the range of 2.5.to 6.5 mm, with the preferred value to be in 4.0.to 6.0 mm.

The U-groove on the cavity die is kept smooth, and the bottom side is built upon with an ejector pin with a cone tip for stripping.

To sum up, the present invention has the following advantages. 1. Since the discharge tube comprises of two neighboring parallel leg tubes of the same curvature radius shaped like a right brace ")", the gap between two adjacent tube units significantly increases (more specifically, increase by six times or more of the diameter of the tube), resulting in more light emitted out from the gap of tubes and hence higher luminous flux per watt;

2. in said compact fluorescent lamps (CFL) discharge tube, each tube unit is consisted of two closing parallel leg tubes with same curvature radius appearing to ")" shape in side view, so the length of the tube unit is shortened comparing to the columnar compact fluorescent lamps (CFL) tube unit, the whole length of the lamp is shortened so that the structure becomes compact;

3. the ventilation space between adjacent discharge tubes for compact fluorescent lamps (CFL) is enlarged, helping to cool down the temperature around the tubes, to increase the durability or life cycle of tubes, and to increase the luminous flux per watt;

4. Unlike the discharge tubes in the patent ZL01253432.3, in which the leg tubes are bent in different dimensions along with the latitude and longitude of a sphere, each leg tube of discharge tubes in the present invention can be easily controlled in mass production to reduce manufacturing cost. In manufacturing, a segment or portion of the originally straight glass tube is heated to bend into a U-shape, while the pair of the leg tubes of the U-glass tube are configured to be in parallel; then by means of the integrated-shaping mould, the U-glass tube is thus in a single process bent to be a curved discharge tube with the same curvature radius, the two leg tubes of the finished discharge tube remain in close parallel; that is, by means of the pair of integrated-shaping moulds or dies, the very single process can produce the compact fluorescent lamps (CFL) in mass production with a low defective rate.

In one word, compared with prior arts, the glass tubes for CFLs disclosed in the present invention provides a higher luminous flux per watt, a small-sized discharge tube, and a better heat ventilation from the light; in addition, the method disclosed in the instant application is applied to mass production in one-shot modeling, especially for manufacturing discharge tubes of power less than 26 W, and of diameter in the range of 6 to 12 mm, reducing both cost and defective rates in production.

DETAILED DESCRIPTION OF PREFERRED EMBODIMENTS

Figure 1:
FIG. 1 is a scheme showing a tube unit of the patent ZL01253432.3.
Figure 2:
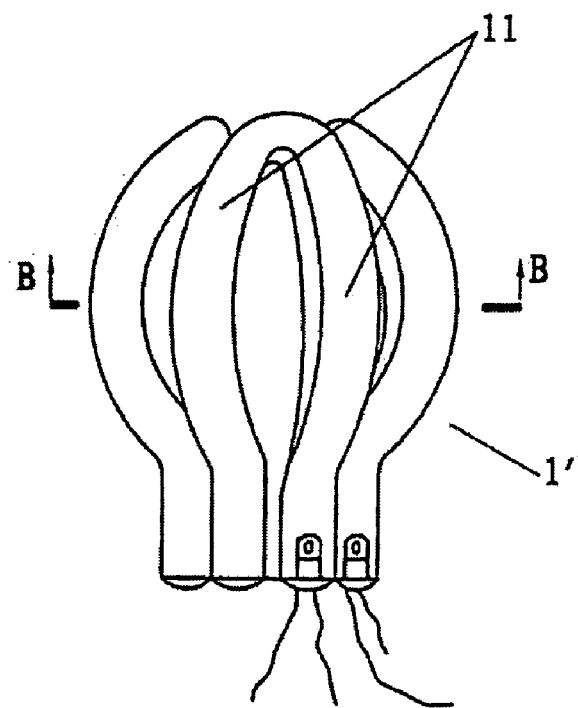
FIG. 2 is a scheme of the patent ZL01253432.3.
Figure 3:
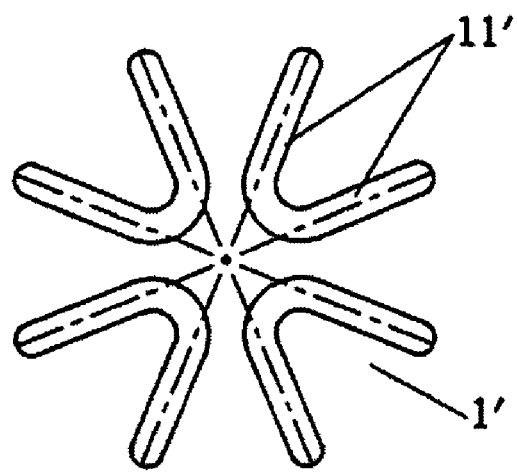
FIG. 3 is a cross-section view showing B-B section of FIG. 2.
Figure 4:
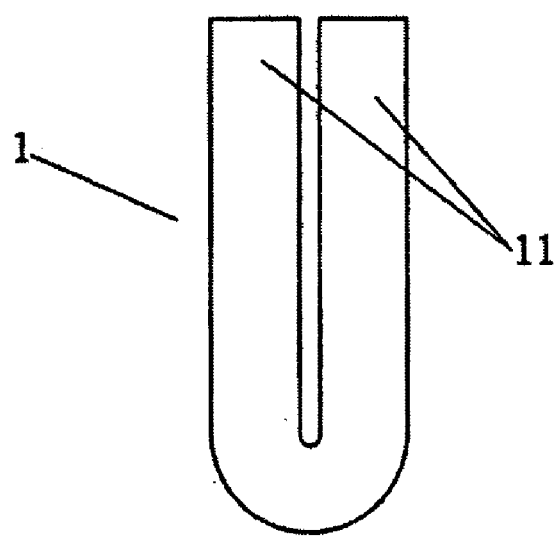
FIG. 4 is a front view showing one discharge tube unit of the present invention.
Figure 5:
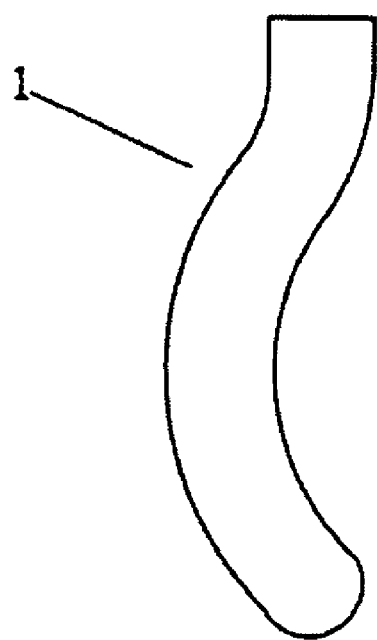
FIG. 5 is a side view showing one discharge tube unit of the present invention.
Figure 6:
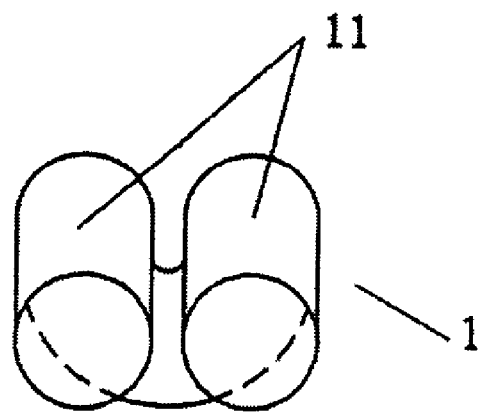
FIG. 6 is a topside showing one discharge tube unit of FIG. 4.
Figure 7:
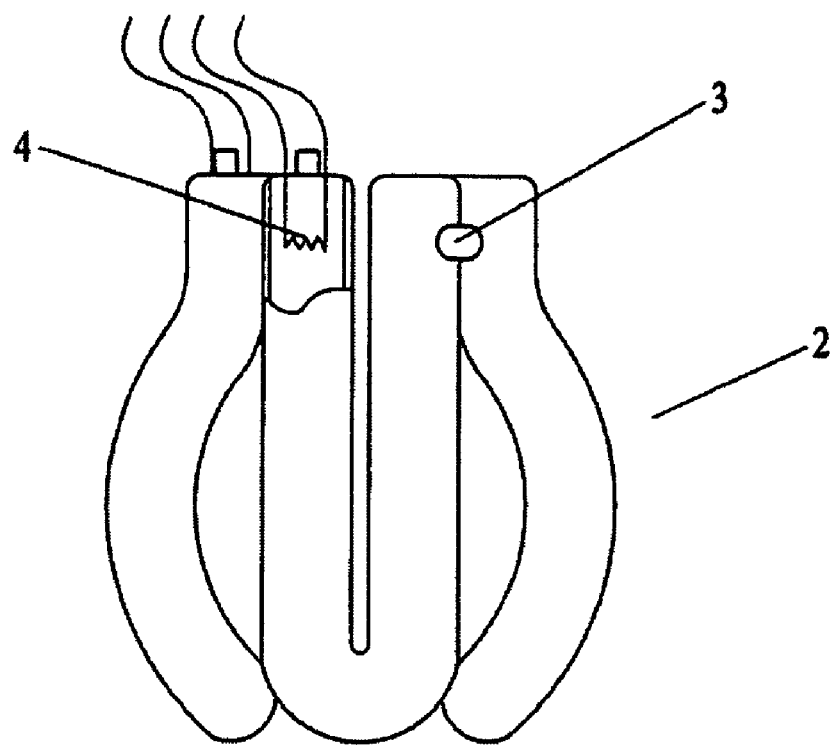
FIG. 7 is a front view showing the structure of the present invention.
Figure 8:
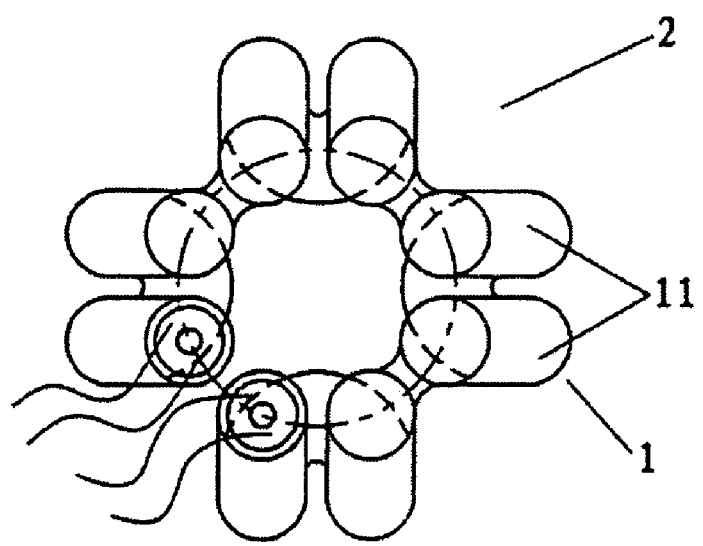
FIG. 8 is a topside view of FIG. 7.
Figure 11:
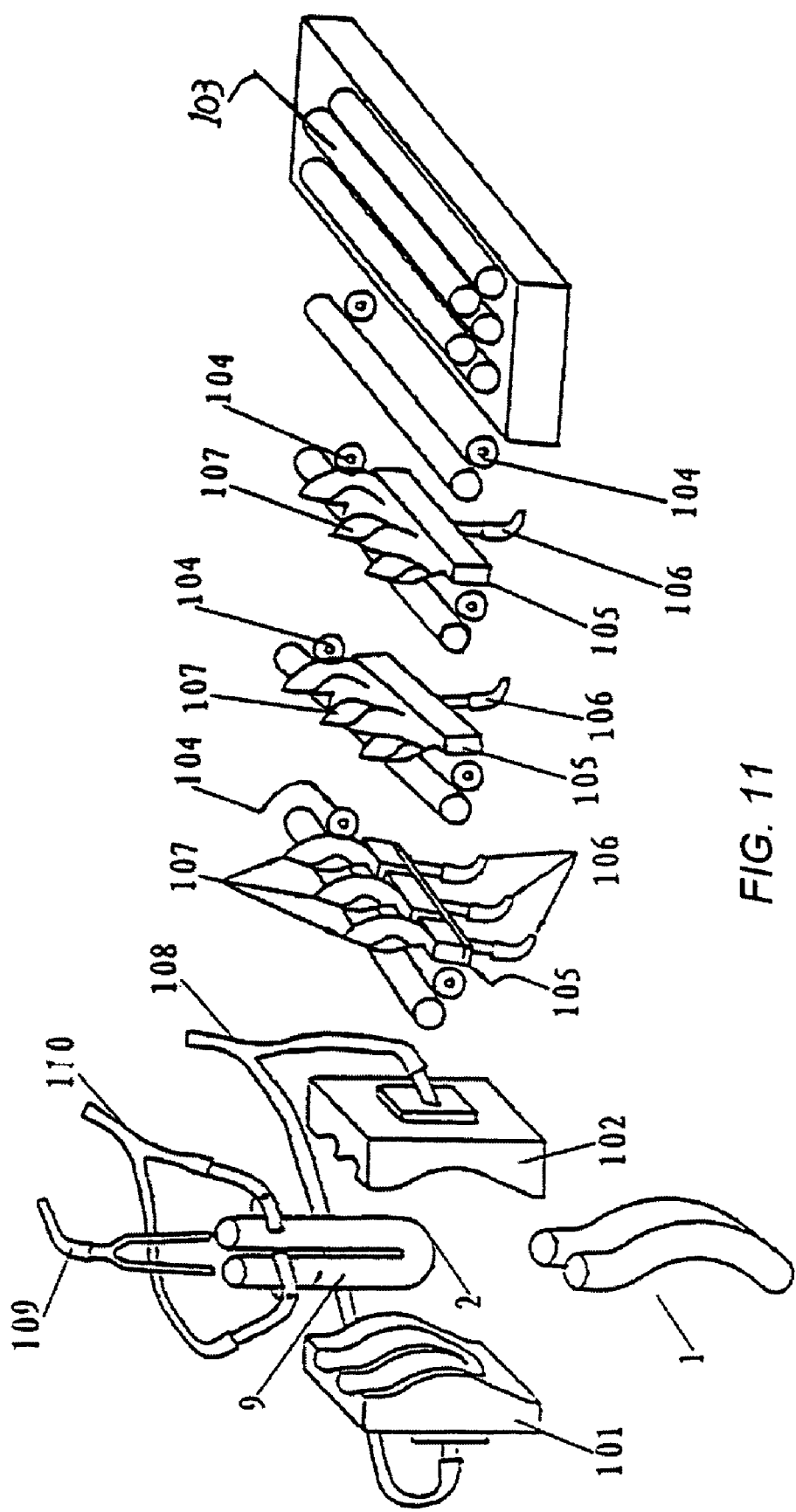
FIG. 11 is a scheme showing the procedures in manufacturing of the discharge tube of the present invention.
Figure 15:
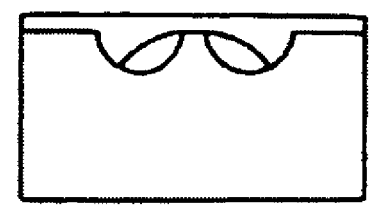
FIG. 15 is a left-side view showing the cavity die for manufacturing a discharge tube of the present invention.
Figure 13:
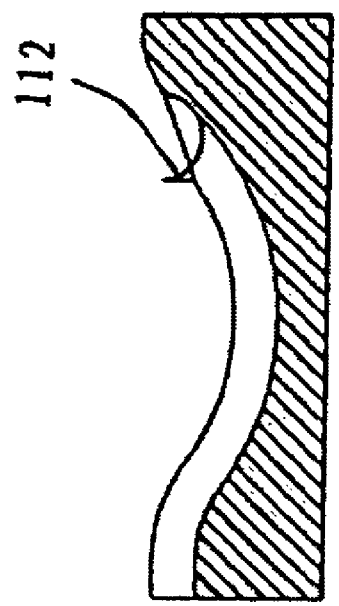
FIG. 13 is a cross-section view of FIG. 12.
Figure 12:
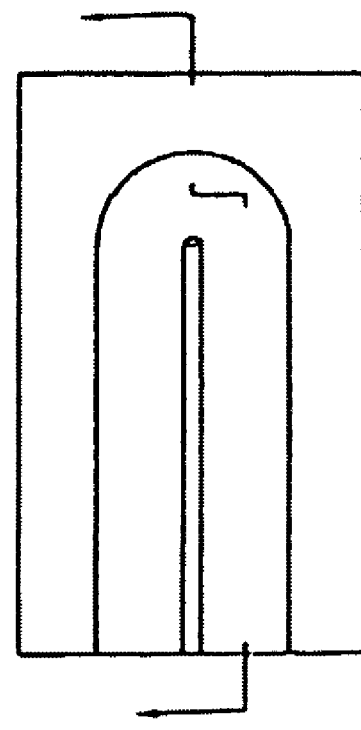
FIG. 12 is a topside view showing the cavity die for manufacturing a discharge tube of the present invention.
Figure 14:
FIG. 14 is a right-side view showing the cavity die for manufacturing a discharge tube of the present invention.
Figure 17:
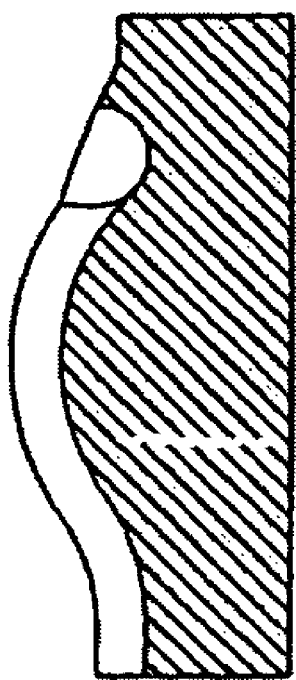
FIG. 17 is a cross-section view of FIG. 16.
Figure 19:
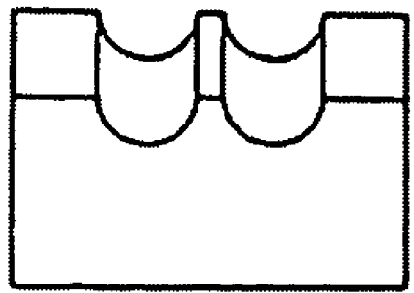
FIG. 19 is a left-side view showing the male die for manufacturing a discharge tube of the present invention.
Figure 16:
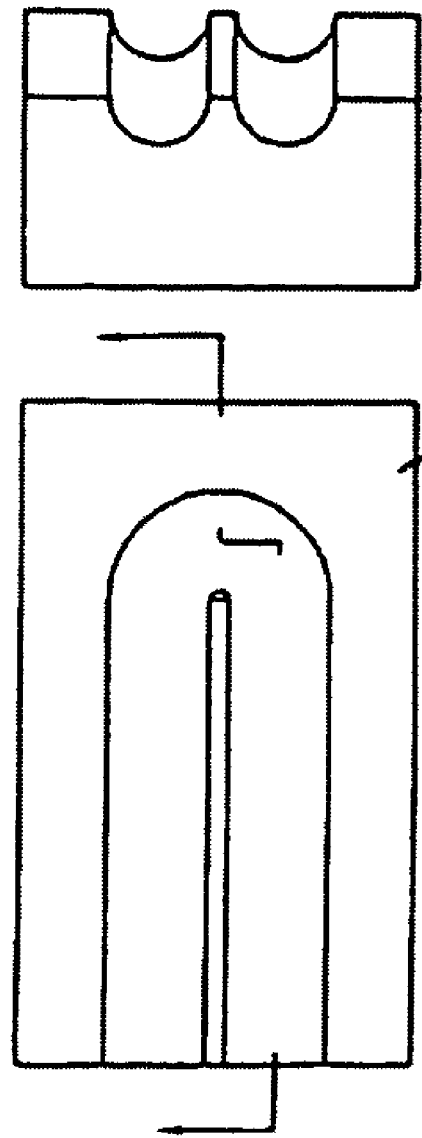
FIG. 16 is a topside view showing the male die for manufacturing a discharge tube of the present invention.
Figure 18:
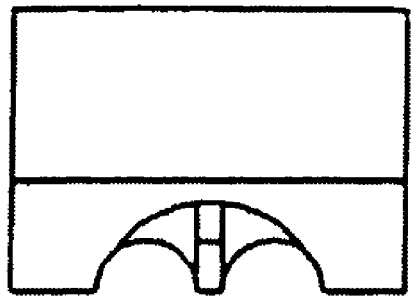
FIG. 18 is a right-side view showing the male die for manufacturing a discharge tube of the present invention.

Referring to FIG. 7 and FIG. 8, a compact fluorescent lamps (CFL) 2 provided by the present invention is typically comprised of four discharge tubes 1 (the number of the discharge tubes is determined by the intended total power) connected together by jumpers in bridge linkage, as shown in FIG. 4 to FIG. 6, while each discharge tube 1 of a U-like glass tube 9 is modeled with the same curvature radius in one single manufacturing process by two mould or die 101 and 102. Referring to FIG. 11, U-like glass tube 9 of the discharge tube 1 is configured in a shape like a right brace as ")" in its side view, so that the leg tubes 11 of the discharge tube unit 1 are close to and semi-parallel to each other (as shown in FIG. 4, FIG. 6, FIG. 7 and FIG. 8). In this embodiment of the present invention, the discharge tube 1 is bent to an arc or an arc of ellipticity (not shown in drawings of the instant application).

The diameter of the leg tube 11 of the discharge tube 1 is in the range of 6. to 0.12 mm.; immediately adjacent discharge tubes 1 are connected together by jumpers 3 in bridge linkage, while leg tubes 11 of the first and the last discharge tubes 1 are pre-installed with filaments 4 insides, and leg tubes 11 of the discharge tube 1 are coated with earth point triad over the inside wall homogeneously, and filled with proper amount of mercury and inert gas.

Figure 10:
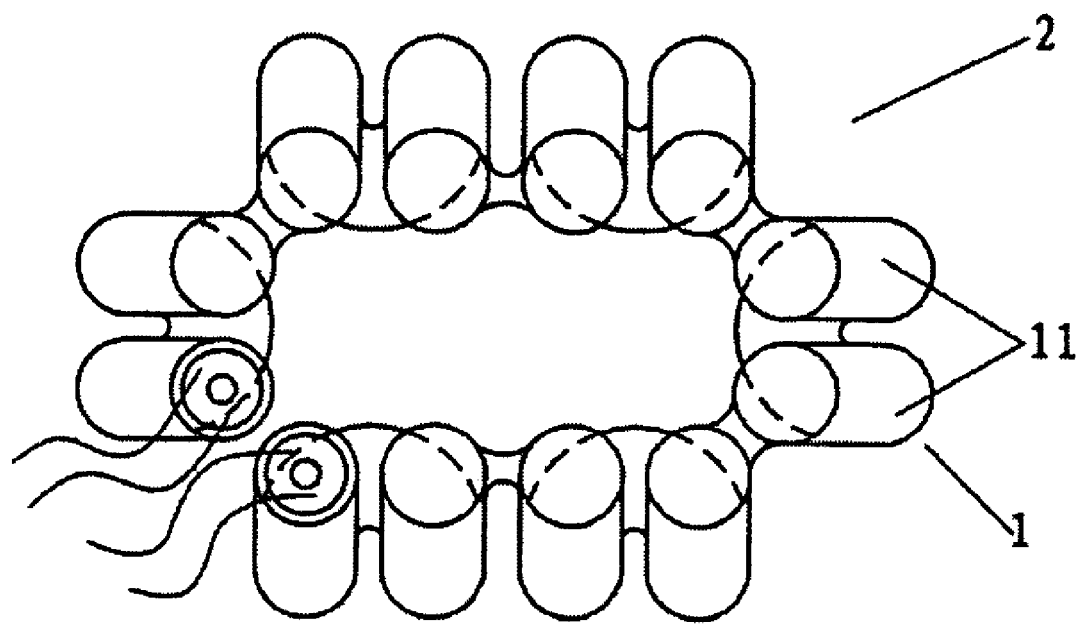
FIG. 10 is a topside view showing another embodiment of the present invention.

In the embodiment of FIG. 7 and FIG. 8, said discharge tubes 1 are configured to a circle arrangement by connecting together with jumpers 3 in bridge linkage to integrate to a compact fluorescent lamps (CFL). The CFL lamp disclosed in the present invention can be configured to various shapes, depending on actual needs. As shown in FIG. 10, all discharge tubes 1 together are configured into a shape of an ellipse by being connected with jumpers 3; in a similar way, the discharge tubes 1 can also be configured into a rectangle, a triangle, or a polegon, and so on.

Figure 9:
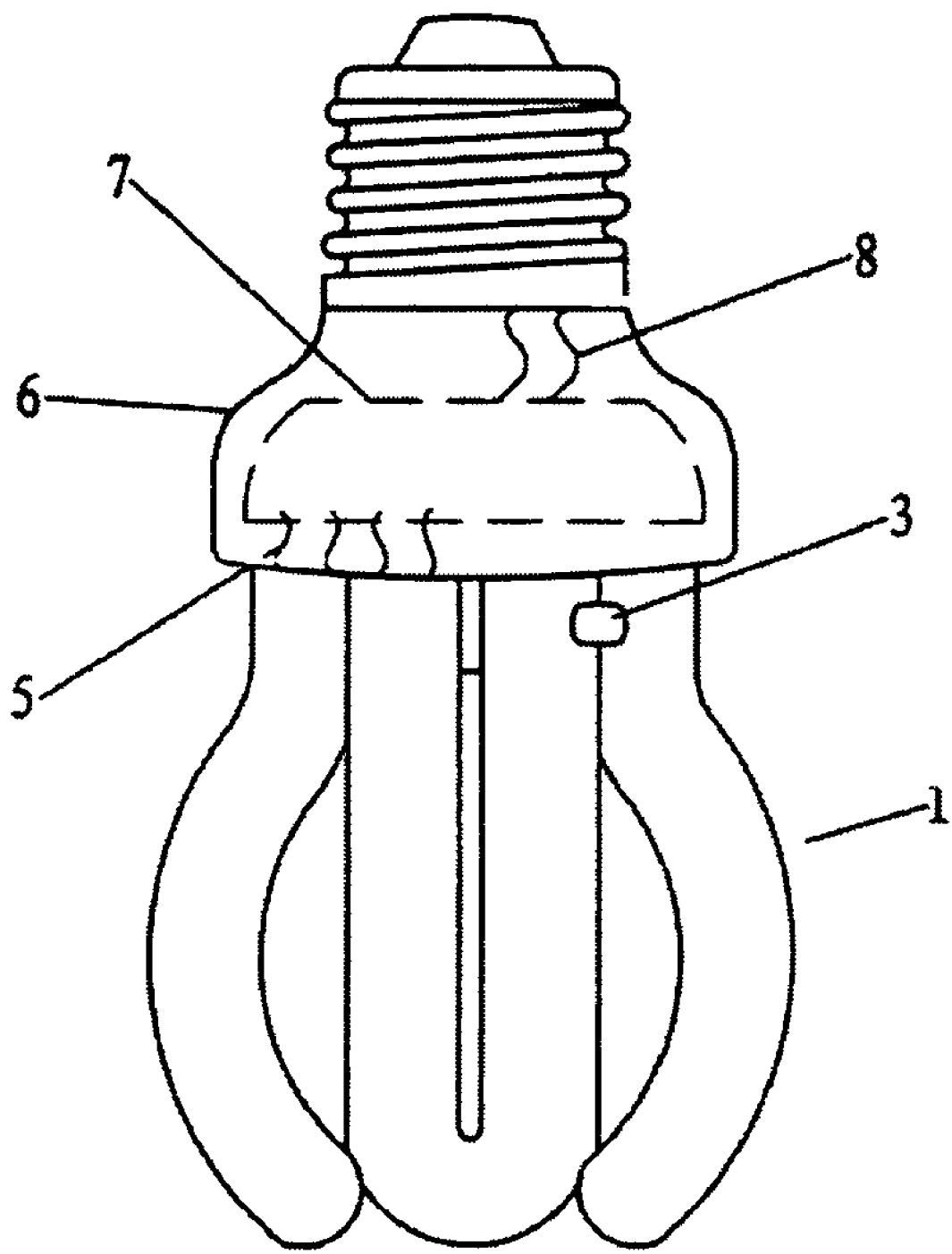
FIG. 9 is a scheme showing the typical embodiment of the present invention.

Referring to FIG. 9, the integrated tube 2 is mounted on a base 6, wires 5 lead the terminals of the filaments 4 out to the ballast 7, and cords 8 connect the output terminals of the ballast 7 to the base to assemble a compact fluorescent lamps (CFL).

Referring to FIG. 12 to FIG. 15, and FIG. 16 to FIG. 19, the cavity die 102 and the male die 101 of the integrated-shaping mould, used for manufacturing U-like tube, the operating apparatus of the present invention. The delimiting boundary line between die 102 and die 101 parting face (or, in a different term, the contacting surface of the mould) of the cavity die 102 and the male die 101 is formed with curved axils of the desired discharge tube 1 so that the U-groove is divided two half-portions on the cavity die 102 and the male die 101 along with the die parting face, while the cross-section of the U-groove on each die appears to half circle, the radius of said U-groove is in 4.0.about.6.0 mm, and the U-groove on the cavity die is built upon with ejector pin with a cone tip at the bottom side for facilitating stripping.

Referring to FIG. 11, in processing the U-glass discharge tube 1, a glass tube 103 is first disposed on the conveyer 104 (other conveyers can be selected also) to be sent into a heater; during the process of heating, the desired portion of glass tube 103 is bent to a U-like shape, while for the other portion of the leg tubes 11 next to the curved segment. The heater includes wide nozzles 105 connecting to a gas inlet pipe 106, as shown in FIG. 11. Inside the heater, there are three nozzles 105 in different width, which could be a single firing head or a series of three firing heads, of which the physical locations of these wide-nozzles 105 are arranged in the sequenc of a first single-firing head followed by a second single-firing head followed by a triple-firing head, or, alternatively, in the sequence of a first single-firing head, followed by a triple-firing head followed by a second single-firing head; the gas led by the inlet pipe 106 is shot out respectively from the nozzles 105 to be ignited to form three beams of flame 107 to soften the glass tube in heating, based on different portions of the straight glass tube 103, differing temperature of heating flame and period of time in hearing, different portions of the glass tube 103 receives different treatment and therefore is shaped differently in the output product. During manufacturing, mechanical arms 110 bend the straight glass tube 103 into a U-like glass tube 9, with the leg tubes 11 of the U-glass tube 9 in parallel; next, said U-glass tube 9 is placed in between the integrated-shaping mould or die 101 and 102; mechanical arm 108 controls the opening or closing of the dies 101 and 102. When cavity die 102 and the male die 101 are closed, the bent U-like glass tube 9 is pressed into the U-groove curved in the curvature radius; the curved portion of the U-like glass tube 9 is then blown to fill into the U-groove of the closed die 101 and 102; when the mechanical arm 108 opens up the cavity die 102 from the male die 101, a finished glass discharge tube 1 can be stripped, in which the two leg tube 11 are parallel and close, so the present invention is suit to industrial scale production in one-shot modeling with low production cost, high efficiency and low rejection.

The above-mentioned embodiments of the present invention are listed to illustrate the main idea of the present invention, which can also be used to manufacturing different shapes of discharge tubes.

I claim:

1. An integrated-shaping discharge tubes for a one-shot-modeled compact fluorescent lamp (CFL) comprising
   a) a conveyer;
   b) straight discharge tubes, comprised of portions and disposed upon said conveyer for molding into a U-tube of a pair of leg tubes of a crescent shape with a same preset curvature radius in a same direction;
   c) a heater with three wide flame nozzles of different flaming temperatures, arranged physically in series for flaming different portions of said straight discharge tube for a period of different duration, depending on said preset curvature radius of said leg tubes;
   d) a pair of integrated-shaping dies, including a male die and a corresponding cavity, and a cross-section of a U-groove of each of dies is semi-circular;
   e) a mechanic arm controlling the opening-up and closing-off of said pair of integrated-shaping dies;
   wherein each of said discharge tubes disposed upon said conveyer is shipped into said heater and treated in portions of said discharge tube by one or more said wide flame nozzles of preset temperatures for a preset duration simultaneously into a U-tube with the pair of leg tubes for fitting into said pair of integrated-shaping dies when said mechanic arm opens up said pair of dies for receiving said U-tube, and
   closes off said pair of dies for moulding said U-tube within by blowing high pressure air to said U-tube said for forming a U-tube with the preset curvature radius.

2. An Integrated-shaping discharge tubes for a one-shot-modeled compact fluorescent lamps (CFL) discharge tube as claimed in claim 1, wherein the diameter of said pair of leg tubes of said U-like discharge tube is in the range of 6. to 0.12 mm.

3. An Integrated-shaping discharge tubes for a one-shot-modeled compact fluorescent lamps (CFL) as claimed in claim 1, wherein said U-tube is bent to the shape of an arc.

4. An Integrated-shaping discharge tubes for a one-shot-modeled compact fluorescent lamps (CFL) as claimed in claim 1, wherein the number of said discharge tubes is two or more.

5. An Integrated-shaping discharge tubes for a one-shot-modeled compact fluorescent lamp (CFL) as claimed in claim 1, wherein two or more said U-tube with a preset curvature radius are assembled into a compact fluorescent lamps (CFL), configured to be in a circle, an ellipse, a rectangle, a triangle or a polygon in the top view thereof.

6. An integrated-shaping discharge tubes for a one-shot-modeled compact fluorescent lamps (CFL) as claimed in claim 1, wherein said wide flaming nozzles come of different width of flaming.

7. An Integrated-shaping discharge tubes for a one-shot-modeled compact fluorescent lamps (CFL) as claimed in claim 1, wherein said wide flame nozzles are arranged in the sequence of single segment, followed by single-segment, followed by triple-segment.

8. An Integrated-shaping discharge tubes for a one-shot-modeled compact fluorescent lamps (CFL) as claimed in claim 1, wherein said wide flame nozzles are arranged in the sequence of single-segment, followed by triple-segment, followed by single-segment.

9. An Integrated-shaping discharge tubes for a one-shot-modeled compact fluorescent lamps (CFL) as claimed in claim 1, wherein based on manufacturer's desired sinuosity of said U-tube, different portions of said U-tube are treated with different heating temperatures by said wide flame nozzles.

10. An Integrated-shaping discharge tubes for a one-shot-modeled compact fluorescent lamps (CFL) as claimed in claim 1, wherein based on manufacturer's desired sinuosity of said U-tube, different portions of said U-tube are treated with different heating temperatures of flames by said wide flame nozzles.

11. An Integrated-shaping discharge tubes for a one-shot-modeled compact fluorescent lamps (CFL) as claimed in claim 1, wherein based on manufacturer's desired sinuosity of said U-tube, different portions of said U-tubeare treated with the same heating temperatures of flame and different heating period of time by said wide flame nozzles.

12. An Integrated-shaping discharge tubes for a one-shot-modeled compact fluorescent lamps (CFL) as claimed in claim 1, wherein based on manufacturer's desired sinuosity of said U-tube, different portions of said U-tube are treated with different heating temperature flame and different heating period time by said wide flame nozzles.

13. An Integrated-shaping discharge tubes for a one-shot-modeled compact fluorescent lamps (CFL) discharge tube, as claimed in claim 1, including a cavity die and a male die, wherein the die delimiting boundary for said two dies is formed along curved axils of the discharge tube so that the U-groove is divided two half-portions respectively formed on the cavity die and the male die along with the die parting face, the cross-section of the U-groove on each die appears to half circle.

14. An Integrated-shaping discharge tubes for a one-shot-modeled compact fluorescent lamps (CFL) as claimed in claim 1, wherein the radius of said U-tube is in the range of 2.5.to .6.5 mm, with the preferred value being in the range of 4.0. to 6.0 mm.

15. An Integrated-shaping discharge tubes for a one-shot-modeled compact fluorescent lamps (CFL) as claimed in claim 1, wherein said U-groove on the cavity die is kept smooth, and the bottom side is built with ejector pin with a cone tip.

\* \* \* \* \*